(12) United States Patent
Marsden (10) Patent No.: US 10,652,738 B2
(45) Date of Patent: May 12, 2020

(54) AUTHENTICATION MODULE (71) Applicant: Eseye Limited, Surrey (GB)

(72) Inventor: Ian Marsden, Surrey (GB)

(73) Assignee: Eseye Limited (GB)

( * ) Notice: Subject to any disclaimer, the term of this patent is extended or adjusted under 35 U.S.C. 154(b) by 459 days.

(21) Appl. No.: 15/054,415

(22) Filed: Feb. 26, 2016

(65) Prior Publication Data

US 2016/0255504 A1 Sep. 1, 2016

(30) Foreign Application Priority Data

Feb. 26, 2015 (GB) .................................. 1503199.0

(51) Int. Cl.
*H04W 12/06* (2009.01)
*H04W 4/70* (2018.01)
*H04W 12/04* (2009.01)
*H04L 29/06* (2006.01)
*H04L 29/08* (2006.01)
*H04W 12/02* (2009.01)

(52) U.S. Cl.
CPC ......... *H04W 12/06* (2013.01); *H04L 63/0428* (2013.01); *H04L 69/329* (2013.01); *H04W 4/70* (2018.02); *H04W 12/04* (2013.01); *H04W 12/04031* (2019.01); *H04L 2209/80* (2013.01); *H04W 12/02* (2013.01)

(58) Field of Classification Search
CPC ............. H04L 2209/80; H04L 63/0428; H04L 69/329; H04W 12/02; H04W 12/04; H04W 12/06; H04W 4/005; H04W 4/70
See application file for complete search history.

(56) References Cited

U.S. PATENT DOCUMENTS

2003/0109256 A1* 6/2003 Holcman .............. H04L 63/061
455/436
2004/0233930 A1* 11/2004 Colby, Jr. ............. H04W 88/02
370/464

(Continued)

FOREIGN PATENT DOCUMENTS

WO WO 2010/012318 2/2010

OTHER PUBLICATIONS

3GPP TS 33.220, "3rd Generation Partnership Project; Technical Specification Group Services and System Aspects; Generic Authentication Architecture (GAA); Generic Bootstrapping Architecture (GBA) (Release 12)", Jun. 26, 2014.

(Continued)

*Primary Examiner* — Beemnet W Dada
*Assistant Examiner* — Sayed Aresh Beheshti Shirazi
(74) *Attorney, Agent, or Firm* — Kilpatrick Townsend & Stockton LLP (57) ABSTRACT

A device 2 is connected to server 34 using encryption exposed at the application layer of device 2. The encryption takes place using a mobile telephony standard encryption. An authentication module is provided in device 2 comprising an IMSI and software to connect to a mobile telephony-like home location register using conventional mobile telephony protocols, except that the mobile telephony-like home location register is adapted simply to authenticate the device 2 and deliver a communication key $K_c$ using the mobile telephony standard without also authorising access to a mobile telephone network.

8 Claims, 4 Drawing Sheets

(56) References Cited

U.S. PATENT DOCUMENTS

| | | | |
|---|---|---|---|
| 2006/0031447 A1* | 2/2006 | Holt | H04L 41/00 709/223 |
| 2006/0105810 A1* | 5/2006 | Gnuschke | H04M 3/42178 455/558 |
| 2008/0081627 A1* | 4/2008 | Shan | H04W 76/19 455/445 |
| 2009/0068985 A1* | 3/2009 | Nguyen | H04L 9/0844 455/411 |
| 2010/0135491 A1* | 6/2010 | Bhuyan | H04L 63/0869 380/247 |
| 2011/0078081 A1* | 3/2011 | Pirzadeh | G06Q 20/32 705/44 |
| 2011/0223971 A1* | 9/2011 | Dewey | H04L 12/6418 455/558 |
| 2013/0247150 A1* | 9/2013 | Cherian | H04L 63/0815 726/4 |
| 2013/0288641 A1* | 10/2013 | Parsons | H04L 63/1441 455/410 |
| 2014/0051423 A1* | 2/2014 | Marsden | H04W 12/0023 455/419 |
| 2014/0289826 A1* | 9/2014 | Croome | H04L 67/141 726/5 |
| 2015/0163102 A1* | 6/2015 | Staykoff | H04L 41/5054 709/203 |
| 2015/0173123 A1* | 6/2015 | Luessem | H04W 76/36 370/328 |
| 2016/0323748 A1* | 11/2016 | Gerstenberger | H04W 12/08 |

OTHER PUBLICATIONS

3GPP TS 31.101, "3rd Generation Partnership Project; Technical Specification Group Core Network and Tenninals; UICC-tenninal interface; Physical and logical characteristics {Release 12)", Dec. 22, 2014.

"3rd Generation Partnership Project; Technical Specification Group Services and System Aspects; Study on security aspects of Machine-Type Communications (MTC) and other mobile data applications communications enhancements (Release 12)", 3GPP Draft; 33868-CIO, 3rd Generation Partnership Project (3GPP), Mobile Competence Centre ; 650, Route Des Lucioles ; F-06921 Sophia-Antipolis Cedex; France Jun. 19, 2014 (Jun. 19, 2014), XP050838130, Retrieved from the Internet: URL:http://www.3gpp.org/ftp/tsg_sa/WG3_Security/TSGS3 75Sapporo/SA#64/specs/- [retrieved on Jun. 19, 2014] * Section 5.2 * .

"3rd Generation Partnership Project; Technical Specification Group Services and System Aspects; Generic Authentication Architecture (GAA); Generic Bootstrapping Architecture (GBA) (Release 12)", 3GPP Draft; 33220-C30, 3rd Generation Partnership Project (3GPP), Mobile Competence Centre ; 650, Route Des Lucioles ; F-06921 Sophia-Antipolis Cedex; France Jun. 26, 2014 (Jun. 26, 2014), XP050907385, Retrieved from the Internet: URL:http://www.3gpp.org/ftp/Specs/2014-12/Rel-12/33_series/ [retrieved on Jun. 26, 2014] * Section 5 and Annex B. *.

* cited by examiner

AUTHENTICATION MODULE

FIELD OF INVENTION

The invention relates to an authentication module, a system using the authentication module, and a method for authentication and encrypting communications.

BACKGROUND TO THE INVENTION

There has been an interest in increasing communication using various networks. In particular, the term the "internet of things (IoT)" has been used to refer to an extension of machine to machine (M2M) communication to a wider variety of devices, including for example household equipment such as washing machines or heating systems.

This increasing connectivity requires corresponding security, since it is undesirable to allow all users access to such devices.

A number of security options are possible. Firstly, where the local device is communicating using a cellular M2M system it is possible to simply ignore additional security and use the inherent security in the cellular communications system and secure the network/internet end—the service provider can provide a secure connection to the internet.

The inherent security in cellular communications makes this approach suitable in some applications. However, the approach does not deal with the increasing prevalence of so-called "Internet of Things" (IoT) devices operating on Local Area Networks (LANs) which may be susceptible to attacks such as the spoofing of a device or a man-in-the-middle attack.

A second option for securing IoT devices is a network wide key programmed at manufacturing into all devices on a network. This is simple to manage. Unfortunately, if the single key is compromised, all devices in the network are at risk.

A third option is a separate key programmed separately into each device at manufacturing, or later. This approach is hard to manage, but does have the advantage that if one device is compromised only that device is compromised.

A fourth option is public key cryptography. This requires access to a certificate authority and puts considerable overload on the processor and network. This may be a problem for a very simple processor which may be used in IoT applications.

A further issue is that many designers of IoT products are not communications engineers and are focussed on other aspects than security.

There is therefore a need for a system and method for securing communications to a remote device.

SUMMARY OF THE INVENTION

According to a first aspect of the invention, there is provided an authentication module for a device using authentication and/or encryption according to a mobile telephony standard, comprising
   an IMSI;
   a secret key;
   algorithms for carrying out authentication and key generation according to the mobile telephony standard using at least the secret key; and
   a serial input/output module for connection to a cellular modem;
wherein the authentication module further comprises:
   an alternate input/output module arranged to deliver authentication and/or encryption functionality to a processor connected to the alternate input/output module.

By using such an authentication module in a device, it is possible to authenticate a device using mobile telephony standards without needing to use mobile telephony. It is also possible to encrypt data end-to-end, for example from the device having the authentication module to a handling server for processing the data which may be remote from the device and connected through the public internet, instead of the conventional approach used in mobile telephony of simply encrypting a message for cellular transmission in the physical layer. Such end-to-end encryption can provide enhanced security.

A second aspect of the invention accordingly relates to a remote device comprising:
   an authentication module for a device using authentication and/or encryption according to a mobile telephony standard, comprising an IMSI, a secret key, and algorithms for carrying out authentication and key generation according to the mobile telephony standard using at least the secret key; and
   a processor connected to the authentication module,
   wherein the processor contains code for accessing the authentication module for accessing authentication and/or encryption functionality according to the mobile telephony standard.

In a conventional mobile device, the processor simply passes data for transmission to a modem, and it is the modem that accesses the SIM for authentication and then encrypts the data for transmission. In contrast, in the present invention, the processor is connected to the authentication module, i.e. not using the functionality of a conventional cellular modem which simply encrypts data passing through the modem but does not make that functionality available to the processor for use other than at the point of transmission.

Thus, the remote device makes the authentication and/or encryption functionality available to the processor, so that a programmer is easily able to access the authentication and encryption functionality using suitable code. In this way, authentication may be performed as required—for example the processor may authenticate when the processor needs to communicate to or from a handling server under the control of the code in the processor, not the modem. Data may be encrypted selectively or as required for the particular application. Such control is not available in the conventional mobile telephony standard where all data is encrypted on transmission and decrypted immediately after wireless reception. Thus, in the conventional standard any onwards transmission to a server is not encrypted using the cellular encryption key which means that further encryption is required if the data is passed onwards through an insecure network such as the internet.

The authentication module may include an alternate input/output module connected to the processor for providing direct access to the authentication and/or encryption functionality. This provides for the additional functionality leaving the conventional functionality of a SIM completely intact.

The authentication module may further comprise a serial input/output module suitable for connection to a cellular modem. The remote device may further comprise a cellular modem connected to the serial input/output module, wherein the processor is connected to the cellular modem. This allows access to standard mobile telephony functions, whether or not the remote device uses mobile telephony for communication.

The remote device may further include a LAN/PAN modem such as a Wifi modem, Bluetooth modem, ZigBee modem or a combined Wifi, ZigBee and/or Bluetooth modem connected to the processor, to allow for connection to a base station and hence onwards through a network to one or more servers.

In order to allow for flexible programming, the authentication and/or encryption functionality in the authentication module may be exposed to the said processor in the application layer.

The system may deliver the authentication and/or encryption functionality to the application level in the processor of the remote device by delivering the communication key to the application level. Code in the application level can then use the communication key to encode data that requires encryption. Alternatively, the system may provide this authentication and/or encryption functionality in the authentication module and provide access to the functionality to the processor through an appropriate interface so that data to be encrypted is passed to the authentication module through the interface, encrypted in the authentication module and then returned to the processor.

In another aspect, there is provided a system for authenticating a remote device using authentication and/or encryption according to a mobile telephony standard, comprising
- a remote device having a processor and an authentication module, the authentication module comprising an IMSI, algorithms and a secret key;
- a home server;
- a network for routing messages between the remote device and the home server, the home server being located at the location on the network indicated as the location of the home location register corresponding to the IMSI;
- an authentication centre connected to the home server arranged to authenticate the remote device and provide at least one communication key for the remote device according to the mobile telephony standard; and
- the remote device is arranged such that the authentication module generates the same at least one communication key and delivers the authentication and/or encryption functionality according to the mobile telephony standard to the application level in the processor in the remote device.

The system can deliver end-to-end authentication and encryption between a handling server and the remote device. Accordingly, the processor and the handling server may be arranged to use a communication key generated in accordance with the mobile telephony standard in cooperation between the authentication server and the authentication module for end to end encryption between the processor and the handling server.

BRIEF DESCRIPTION OF THE DRAWINGS

An example of the invention will now be described with reference to the accompanying diagrams, in which.

DETAILED DESCRIPTION

Figure 1:
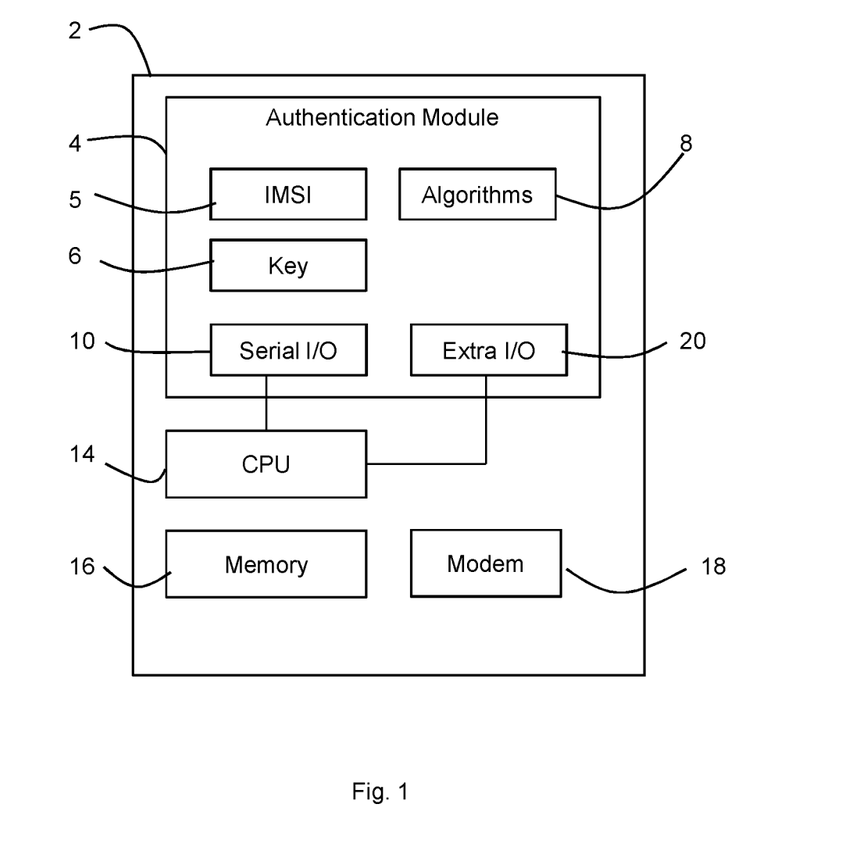
FIG. 1 illustrates a schematic of a first embodiment of a remote device according to the invention.
Figure 2:
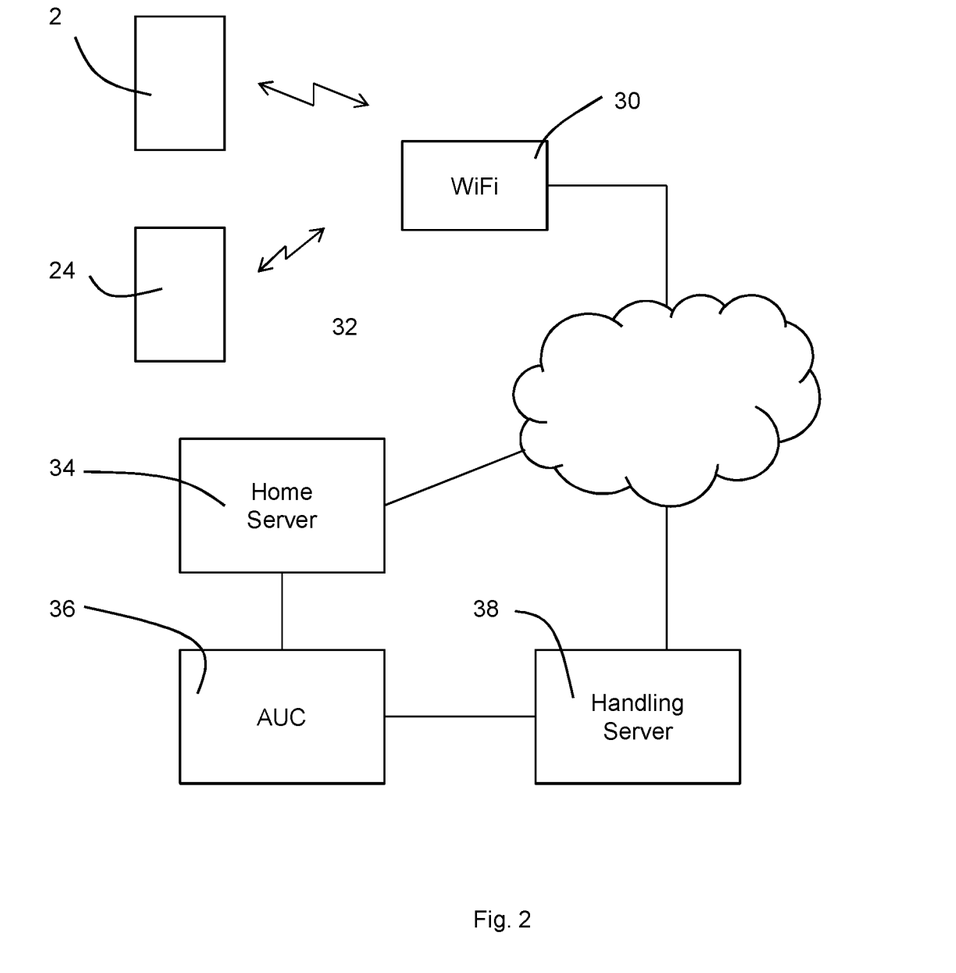
FIG. 2 illustrates a schematic of the remote device of FIG. 1 connecting to a server.

In a first embodiment of the invention, illustrated in FIGS. 1 and 2, there is provided a remote device 2 including an authentication module 4.

The authentication module 4 follows the standards for a subscriber identification module (SIM) as used in mobile telephony in certain respects, so that it can act in a similar way for the purposes of authentication. Thus, the authentication module 4 has a local key 6 or keys. The authentication module 4 may therefore be considered to be a SIM for most purposes. However, as explained below, alternative functionality is provided either in the form of software interfaces or, in the arrangement of FIG. 1 by the alternate serial input output module 20.

Those skilled in the art will realise that different mobile telephony standards have similar approaches to authentication and to the supply of keys that nevertheless differ in detail. For example, in the GSM approach, the mobile station (e.g. a mobile phone) stores a mobile key $K_i$ and an International mobile subscriber identity (IMSI), for example, upon a SIM. When the mobile station first connects to a mobile switching centre (MSC) the IMSI is provided to the MSC by the mobile station. The IMSI is routed to the home location register (HLR) corresponding to the IMSI which then activates an authentication centre (AUC). The authentication centre has a copy of the mobile key ($K_i$) corresponding to the IMSI and generates a triple from that mobile key and a newly generated random number RAND. The triple includes a communication key $K_c$, a signed response SRES and the random number RAND. The SRES is calculated from the mobile key $K_i$ and the random number RAND using a first algorithm and the communication key $K_c$ is calculated from the mobile key and the random number RAND using a second algorithm. The mobile station has copies of these same two algorithms for authentication purposes. The random number RAND is then sent back to the mobile station which calculates the SRES at its end from the mobile key $K_i$ and the random number RAND using the first algorithm. The mobile station then transmits the calculated SRES back to the AUC at the HLR. If the SRES received by the AUC (i.e. that SRES calculated by the mobile station) matches the SRES calculated by the AUC authentication is successful.

Communication may then take place. The communication key $K_c$ is transmitted from the AUC to the mobile switching centre MSC to which the mobile device is connected. The mobile device calculates the communication key $K_c$ from the random number RAND already sent and the mobile key $K_i$ using the second algorithm. The mobile device and MSC can then communicate with one another using the communication key $K_c$.

Thus, the SIM has the functionality of storing a mobile key, and the ability to calculate the SRES from a first algorithm and the communication key from a second algorithm. The first algorithm is used for authentication and so may be referred to as an authentication algorithm, and the second algorithm is used to calculate a communication key and so may be referred to as a key-generating algorithm.

Other communications protocols according to mobile telephony standards use approaches that differ in detail. For example, the 3G communications protocol also uses the IMSI and a shared secret (mobile) key, but uses no fewer than five (or six) different algorithms. The authentication centre transmits both a random number RAND and another number AUTN to the mobile station. In this case, the AUC transmits some numbers to a controlling entity and the mobile station transmits a number to the controlling entity—if the numbers are the same the mobile station is authenticated.

The details of the process in the 3G communications protocol are known to those skilled in the art and so will not be repeated. For the present purposes, however, all that is required is to note that the process requires the storage of a secret key on the SIM as well as the provision of various algorithms to generate numbers for use in authentication and a communication key in a similar way to the GSM process. As will be known to those skilled in the art, the authentication approach for 3G does not just authenticate the mobile station to the AUC but also allows the mobile station to authenticate that it is in communication with an authorized link ultimately connecting back to the true HLR.

The inventors note that the authentication algorithms used in mobile telephony standards are well defined in those standards. They include in particular: COMP128-1, COMP128-2, COMP128-3, COMP128-4 MILENAGE, A5 A3/A8, KASUMI UEA1 UIA1, SNOW UEA2 UIA2, CAVE and AES 128. These are algorithms used for authentication and/or encryption according to a mobile telephony standard. The term "authentication algorithms for carrying out authentication and key generation according to the mobile telephony standard using at least the secret key" refers only to those specific authentication algorithms used for authentication and key generation according to mobile telephony standards, and not to other algorithms that may be used for authentication in a broad sense but not for authentication on a network.

In the present invention, the authentication module 4 includes the functionality for authentication using one or more mobile telephony standards, and hence includes an identification code 5, one or more shared keys 6 (e.g. mobile key $K_i$) and authentication algorithm code 8 coding one or more corresponding authentication algorithms. Note that the identification code 5 is in the form of an IMSI, i.e. with a country code and a "mobile operator", even if in this case the mobile operator is not in fact delivering a mobile telephony service to that IMSI.

Indeed, in the present embodiment (FIG. 1) the remote device 2 does not include a mobile telephony modem. Instead, there is a wireless LAN/PAN module 18 for wireless communication. In this embodiment, the wireless module 18 is set up for "Wifi" communication but could equally use other LAN technologies such as ZigBee or Bluetooth communication.

Thus, the remote device 2 has an authentication module 4 including some of the functionality of a conventional mobile telephony standard even though in this case it communicates using a different approach. Thus, the authentication module may be thought of as a subscriber identity module "SIM" even though the functionality in this case is not complete. The authentication module may be provided in the format of a SIM card or alternatively as a more conventionally packaged chip. In the embodiment described, the authentication module 4 is packaged as a chip SIM, i.e. in a conventional chip package. Such a chip SIM typically uses six pins to communicate but is mounted in an eight-pin package. One of these is a conventional input output pin which is connected to serial communications module 10 and which handles the conventional operation of the SIM. In the present embodiment one or both of the normally unused pins is used for communications with an alternate serial input/output module 20 which handles additional functionality as discussed in more detail below.

Note that the conventional serial input output unit 10 is designed to be connected to a modem 40 (as in the embodiment illustrated below in FIG. 4) and not directly to the processor. Accordingly, in this embodiment the alternate input/output module 20 is used to connect to the processor.

As illustrated in FIG. 2, in the embodiment described a number of remote devices 2, 24 may be provided each in communication with a wireless base station 30. The wireless base station 30 is further in communication with the internet 32.

The remote device 2 also includes a conventional processor 14 and memory 16 which are programmed so that the remote device 2 can carry out those functions it is programmed to perform. Thus, the memory 16 contains code for causing the processor to carry out the necessary communication and to carry out any additional programming required by the particular application. For example, if the remote device 2 includes a thermometer for use in an application for controlling the heating of a house, the processor 14 may be programmed to measure the temperature from time to time, for example at periodic intervals. The remote device 2 may be also programmed to deliver the information to a handling server 34. Another remote device 24 may be a boiler control which likewise is in communication with handling server 34 so that the measured temperature can be used to control the boiler.

Home server 34 is provided connected to an authentication centre AUC 36. Handling server 38 connects to the remote devices 2, 24 and delivers functionality. For example, the handling server may monitor the remote device, store data, and deliver the data to the same remote device or other authorized remote devices.

In use, in order to authenticate the remote device 2, code in processor 14 causes the processor to instigate connection to the home server 34 via the wireless module 18 in the remote device, which connects to the wireless base station 30 which in turn connects to the home server 34 through the internet 32. The processor 14 accesses the authentication module 4 through alternate input/output module 20. The authentication module generates an authentication message according to the mobile telephony protocol, including the IMSI 5, and passes the authentication message back to the processor 14 which in turn passes the message on to wireless module 18 which sends the authentication message to the home server 34.

The home server 34 then passes the authentication message onto an authentication centre AUC 36 which then authenticates the remote device using the authentication algorithms. Typically, this requires generating at least one response message sent back from the AUC to the authentication module 4, a further response message sent from the authentication module 4 to the AUC 36 or home server 34 and further calculations carried out in the AUC 36, home server 34, authentication module 4 or in processor 14.

For example, where the authentication is to be carried out using a GSM protocol, the AUC 36 generates a triple and sends a response message including the random number RAND back to the remote device 2 via the internet 32 and wireless base station 10. The authentication module 4 then calculates the signed response SRES and returns it as a further response to the AUC 36. The AUC 36 then checks whether the received SRES matches the SRES calculated in the AUC 36 and if the two match confirms authentication. It then delivers a calculated communication key $K_c$ to the handling server 38.

Following authentication, communication between the remote device 2 and the handling server 38 can be encrypted using the communication key $K_c$. Typically, it may not be necessary to encrypt each message or communication, depending on the application, and only those messages containing sensitive data need to be encrypted.

Although in this embodiment the authentication centre 36 and the authentication module 4 in the remote device 2 carry out authentication using the GSM authentication profile, other approaches (e.g. 3G, 4G) can be used as required. Further, note that authentication is carried out using the GSM authentication protocol even though remote device 2 has no GSM capability.

It will be appreciated that in this case the IMSI 5 may typically not represent an IMSI that gives access to mobile telephony services. However, all IMSI's effectively provide a pointer to a server which functions as the home location register, HLR, since the IMSI specifies the mobile network operator who will have an HLR. In the present case, the network operator is a virtual mobile network operator having the home server 34 indicated as the HLR. This allows the remote device 2 to locate the home server 34 using the convention mobile network functionality. In the case, as in this embodiment, where the home server does not deliver the full functionality of the mobile network this is achieved only by programming the home server 34 and AUC in a different manner to that of a conventional HLR while as far as the remainder of the mobile network is concerned messages between the remote device 2 and home server 34 are routed exactly as conventional messages between a cellular device and conventional HLR.

Figure 3:
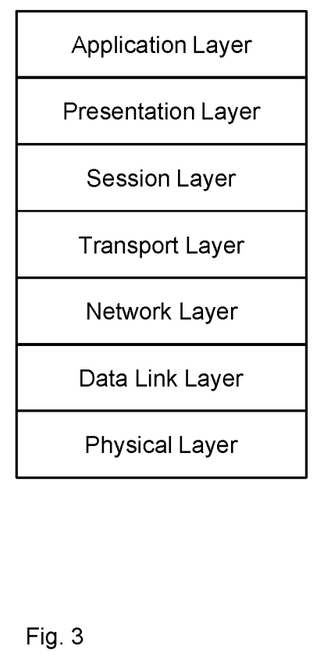
FIG. 3 illustrates different communications layers.

FIG. 3 illustrates a conventional multi-layer description of data communications. The highest layer is the application layer and this is the layer accessible to programmers of the processor 14. Underlying the concept of the present invention is to make available to the application layer functionality normally hidden much lower down in the stack, in the physical layer or perhaps the transport layer.

In a conventional mobile device, the encryption of the signal is carried out in the physical layer and the decryption of the signal is likewise carried out in the physical layer at the base station.

In the device illustrated in FIG. 1, this encryption and decryption functionality is made available at the application level in the remote device 2 and at the handling server 38. In other words, rather than simply securing the physical data link with a cellular encryption key, the arrangement allows end-to-end encryption using a communication key (or keys). Encryption may be performed by the processor 14 using a communication key generated by the authentication module 4 in cooperation with the AUC 36, the communication key being provided to the processor through the alternate serial communications module (Alternate I/O) 20.

Use of this approach provides the benefit that the level of encryption of different data can be varied by the programmer of the processor 14 since the encryption is made available at the applications layer and hence can be used only as and when required. It may be the case that much of the communication is entirely non-secret and can be transmitted in plain text. Only a small amount of the data, for example containing personal details, needs to be encrypted. In this way, the volume of encrypted data can be much reduced, reducing the amount of encrypted data that is available for attempted cracking of the encryption. Furthermore, encrypting only a small amount of data may reduce the computational overhead, which may reduce the power consumption of the processor. This may be of particular importance in very simple remote devices with low power processors and especially, for example, where the remote device is battery operated and processing should be minimized to maximize battery life.

By making the encryption functionality available at the application level in the processor 14 the programmer generating the code controlling the processor 14 can easily control the encryption and encrypt only where necessary without requiring the programmer to have high level expertise in data security.

Thus, in the remote device 2 additional functionality is provided to enable the application layer running in the processor 14 to poll the authentication module 4 to access a communication key (e.g. $K_c$) or to use the communication key to encrypt communication packets.

Since this is a non-standard function, in the embodiment shown the authentication module 4 has an alternate serial communications module 20, which can be polled by the application layer in the processor module 14. This allows the conventional serial I/O communications module 10 to have exactly the same functionality as in a conventional SIM.

The alternate serial communications module 20 communicates with the processor using the additional one or two pins. A conventional chip type SIM chip uses six pins but is packaged in an eight pin package. The authentication module 4 of FIG. 1 uses an additional pin to connect the alternate serial communications module 20 to the processor 14.

As far as the processor 14 is concerned, this additional functionality can thus be accessed in the same way as off-the shelf hardware encryption solutions—an alternative input-output port on processor 14 connects with the alternate serial I/O module 20 on the authentication module 4 to deliver a communication key (e.g. $K_c$), alternatively named an encryption key.

The programmer of processor 14 can access this additional functionality by calling suitable code, for example using an API. The programmer therefore does not need to know how the encoding takes place—this is handled in code provided by a compiler.

In an alternate arrangement, the encryption is carried out in the authentication module 4. In this alternate arrangement, when the processor 14 needs to send an encrypted message back to the handling server 38 the message is passed to the authentication module 4 via the alternate serial communications module 20. The authentication module 4 then encrypts the message using the algorithms 8. The encrypted message is then passed to wireless module 18 via processor 14 which connects to the wireless base station 30 for communication to the server 34. Again, this functionality may be accessed by the programmer of the processor 14 by accessing a suitable API or by calling a suitable routine.

This approach allows the conventional processor to be programmed in a conventional way without requiring any expertise in authentication or cryptography. The authentication module 4 functions as a unit for carrying out this functionality.

In order to permit communication between more than one of the remote devices 2, 24 each remote device may communicate individually with handling server 38. The handling server 38 may then pass messages received from one device to another device where appropriate. In this way, it can be ensured that communications only occur between devices authenticated at the home server 34 and AUC 36.

Figure 4:
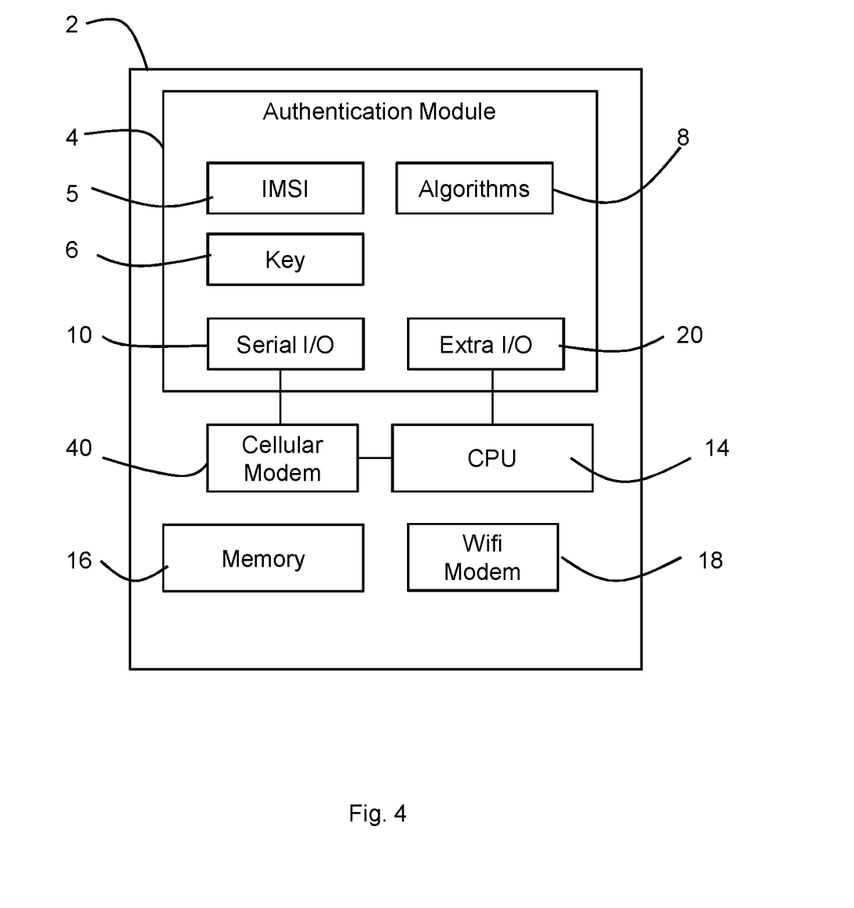
FIG. 4 is a schematic of a second embodiment of a remote device according to the invention.

In a second embodiment, illustrated in FIG. 4, the remote device 2 further comprises a cellular modem 40, to allow mobile telephony and communication between the remote device 2 and servers 34,38 to take place over a mobile telephony channel. In the embodiment illustrated in FIG. 4 the authentication module includes two IMSIs, the IMSI 5 discussed above which is used to communicate to server 34 and an additional cellular IMSI 7 used in the mobile communications. It will be appreciated that in alternate embodiments a separate SIM holding the cellular IMSI 7 may be provided.

In the arrangement of FIG. 4, the same functionality is provided to deliver the communication key or encryption functionality to the application layer in processor 14 as in the arrangement of FIG. 1. This allows end to end communications between the application layer in remote device 2 and the handling server 38 without requiring complex communications knowledge.

The arrangement differs from the conventional use of the cellular encryption key to encrypt data between the remote device 2 and the base station 30 to which the remote device 2 connects in that the communication key or encryption functionality is made available to the applications at both ends; using the alternate serial communications module 20 to provide the communication key or encryption functionality to the processor 14, and by appropriate software on the AUC 36 that delivers the communication key to the applications layer in handling server 38 so that the handling server 38 can encrypt and decrypt messages.

The access to the authentication module 4 for conventional functions is, in the present embodiment, performed through the cellular modem 40.

The functionality of the authentication module 4 works in both the arrangement of FIG. 1, without a cellular modem 40, and the arrangement of FIG. 4, with a cellular modem 40. The provision of the extra functionality through the alternate serial communications module 20 allows the cellular modem 40 and authentication module 4 to operate exactly as with a conventional SIM. The only difference is the exposure of the communication key or encryption functionality to the application layer through alternate serial communications module 20.

The modem 40 ensures that the signal transmitted wirelessly through the mobile network is encoded in the physical layer using a cellular encryption key $K_{cellular}$ corresponding to the HLR of the mobile service provider authenticated using the cellular IMSI 7 which is used for that mobile communication. This cellular encryption is additional to the encryption using the communication key $K_c$ obtained using IMSI 5 from AUC 36 via home server 34 as discussed above. The wireless signal is thus double encrypted. The benefit is that the encryption does not just protect the communication through the wireless connection but is also available in the application layers in device 2 and server 34 to enable end to end encryption.

An alternate way in which the communication key $K_c$ may be exposed to the application level of processor 14 in the remote device 2 is to change the programming of the cellular modem 40 so that the cellular modem 40 can access the communication key $K_c$ and make it available at the applications layer in processor 14.

In this alternate arrangement, the alternate input/output module 20 illustrated in FIG. 4 may optionally be omitted.

In a further alternate arrangement, the cellular modem 40 is again reprogrammed in this case to use the encryption transparently on the data path without requiring the programmer of processor 14 to be aware of the encryption.

Note that the arrangement illustrated in FIG. 4 with a cellular modem 40 may also be used even in a remote device 2 that only connects using a wireless modem 18. In this case, the cellular modem 40 delivers the standard connectivity to the authentication module 4 using conventional SIM standards. There is in this instance no need for cellular IMSI 7 since there is no communication through a mobile network that would require the cellular IMSI.

Additional functionality may be provided by the server 34. In particular, the server 34 can monitor the use of keys and require reissuance of a communication key after a particular time, either using conventional GSM OTA (over the air) management or through application level management Furthermore, although the above embodiments describe remote communications using a wireless modem 18, the authentication and encryption methods provided may also be used when connecting on a wired network.

The above embodiments are able to deliver a secure end-to-end managed security service that is easy to use for the programmer of the remote device and which does not require the use of any particular physical transport structure (e.g. cellular, Wi-Fi, Bluetooth). The service is delivered by small changes to existing SIM modules to provide authentication modules 4 as described above to deliver additional functionality without affecting the fundamental underlying security used in mobile telephony communication. Although the embodiments above teach a home server 34, AUC 36 and handling server 38, these may in appropriate circumstances be combined in a single physical server. Alternatively, the functionality of the home server 34, AUC 36 and handling server 38 may be provided by networked processors.

The invention claimed is:

1. A remote device arranged to communicate with a handling server, the remote device comprising:
   an authentication module for the remote device using authentication according to a mobile telephony standard, wherein the authentication module is stored on a storage medium of the remote device and comprises an IMSI, a secret key, an alternate serial communications module, and authentication algorithms for carrying out, by the remote device, authentication and key generation according to the mobile telephony standard using at least the secret key; and
   a processor connected to the authentication module, wherein the authentication module further comprises a serial input/output module configured to connect to a cellular modem, and wherein the alternate serial communications module provides a communication key to an application layer running in the processor that connects to a wireless module,
   wherein the processor contains code for accessing the authentication module and that, when executed by the processor, configures the processor to use said authentication algorithms for encrypting, at a non-physical layer, communications from the processor over a physical transport structure to the handling server to provide end-to-end encryption for communication with the handling server independently of the physical transport structure used.

2. A remote device according to claim 1 further comprising a LAN/PAN modem.

3. A remote device according to claim 1 wherein
   the authentication algorithms in the authentication module is exposed to the said processor in the application layer.

4. A system for authenticating a remote device of claim 1 using authentication according to a mobile telephony standard for communication between the remote device and a handling server, the system comprising:
   the remote device having a processor and an authentication module;
   the handling server;
   a home server;

a network for routing messages between the remote device and the home server, the home server being located at a location on the network indicated as the location of the home location register corresponding to the IMSI;

an authentication centre in communication with the home server, the authentication centre maintains code to authenticate the remote device and provide at least one communication key for the remote device according to the mobile telephony standard; and program code, resident in the remote device, to generate the communication key that is same as the received at least one communication key with the authentication module and to deliver the authentication functionality according to the mobile telephony standard to the application layer in the processor in the remote device to provide end to end encryption using the authentication algorithms between the remote device and the handling server independently of the physical transport structure used for communication between the remote device and the handling server.

5. A method for authenticating a remote device of claim 1 using authentication according to a mobile telephony standard for communication between the remote device and a handling server, the method comprising:

sending an authentication message through a network from the remote device;

forwarding the authentication message to a home server located at location on the network indicated as the location of the home location register corresponding to the IMSI;

receiving the authentication message at an authentication centre connected to the home server;

authenticating the remote device according to the mobile telephony standard on the basis of the received authentication message;

delivering the communication key from the authentication centre to a handling server;

generating the communication key in the remote device that is identical to the delivered communication key received by the handling server; and encoding data transferred between the handling server and the remote device using the communication key to provide end to end encryption between the remote device and the handling server independently of the physical transport structure used for communication between the remote device and the handling server.

6. The method according to claim 5 wherein authenticating the remote device comprises sending a response message back from the authentication centre to the authentication module.

7. The method according to claim 5 comprising communicating with the remote device through a LAN/PAN modem.

8. A system for authenticating a remote device of claim 1 using authentication according to a mobile telephony standard, for communicating between the remote device and a handling server, comprising the remote device;

the handling server;

a home server;

a network for routing messages between the remote device and the home server, the home server being located at the location on the network indicated as the location of the home location register corresponding to the IMSI; and an authentication centre connected to the home server containing code to authenticate the remote device and provide at least one communication key to the remote device, and perform encryption according to the mobile telephony standard.

\* \* \* \* \*